Aug. 3, 1937.  E. BUGATTI  2,089,110
RAILWAY OR TRACK VEHICLE
Filed Feb. 1, 1933  13 Sheets-Sheet 1

Inventor
Ettore Bugatti
By Mauro & Lewis
Attorney

Aug. 3, 1937.   E. BUGATTI   2,089,110
RAILWAY OR TRACK VEHICLE
Filed Feb. 1, 1933   13 Sheets-Sheet 2

Inventor:
Ettore Bugatti
By Mauro & Lewis
Attorneys

Aug. 3, 1937.  E. BUGATTI  2,089,110
RAILWAY OR TRACK VEHICLE
Filed Feb. 1, 1933   13 Sheets-Sheet 4

Aug. 3, 1937.   E. BUGATTI   2,089,110
RAILWAY OR TRACK VEHICLE
Filed Feb. 1, 1933   13 Sheets-Sheet 6

Aug. 3, 1937.  E. BUGATTI  2,089,110
RAILWAY OR TRACK VEHICLE
Filed Feb. 1, 1933  13 Sheets-Sheet 7

Inventor
Ettore Bugatti
By Maurice Lewis
Attorneys

Aug. 3, 1937.  E. BUGATTI  2,089,110
RAILWAY OR TRACK VEHICLE
Filed Feb. 1, 1933    13 Sheets-Sheet 8

Inventor:
Ettore Bugatti
By Mauro & Lewis
Attorneys

Aug. 3, 1937.  E. BUGATTI  2,089,110
RAILWAY OR TRACK VEHICLE
Filed Feb. 1, 1933   13 Sheets-Sheet 9

Inventor
Ettore Bugatti
By Mauro + Lewis
Attorneys

Aug. 3, 1937.　　　　E. BUGATTI　　　　2,089,110
RAILWAY OR TRACK VEHICLE
Filed Feb. 1, 1933　　　13 Sheets-Sheet 10

Aug. 3, 1937.  E. BUGATTI  2,089,110

RAILWAY OR TRACK VEHICLE

Filed Feb. 1, 1933  13 Sheets-Sheet 11

Inventor:
Ettore Bugatti
By Mauro & Lewis
Attorneys

Patented Aug. 3, 1937

2,089,110

UNITED STATES PATENT OFFICE 2,089,110

RAILWAY OR TRACK VEHICLE

Ettore Bugatti, Molsheim, France

Application February 1, 1933, Serial No. 654,752
In France February 6, 1932

34 Claims. (Cl. 105—183)

The railway trucks of locomotives and rolling stock have, among other advantages over rigid axles, that of reducing the action of shocks due to inequalities of the railway track for instance at rail joints.

In order to better explain the considerations that have led to the present invention, I have shown diagrammatically in Figures 1, 2 and 3 of the appended drawings an ordinary four-wheeled railway truck.

In the four-wheeled railway truck which is most commonly used at the present time, when one of the axles is raised, due to local inequalities on the track, by a distance $b$, the kingbolt is raised at the most by $$\frac{b}{2}$$

and if that inequality exists only on one side of the track (as in the case of badly connected joints for instance), the upward displacement is only $$\frac{b}{4}$$

at the most since only one of the wheels at a time passes over the said inequality. I have shown in Fig. 1 in dotted lines, the position occupied by the frame and the front wheel when the latter passes over an inequality corresponding to distance $b$.

There exists also at the present time sixwheeled railway trucks comprising a rigid frame, and it might be shown in the same manner as in the preceding case, that the multiplication of the axles has the effect of reducing the amplitude of the vertical displacement transmitted to the body. The same is also true concerning lateral displacement. Fig. 3 shows that for a fourwheeled truck when the front wheel is given a lateral displacement equal to $a$, the kingbolt of the truck is given a displacement of $$\frac{a}{2}$$

Now up to this time railway trucks having more than three axles have not been employed in view of the difficulties resulting from the use of rigid frames relatively to a correct running in the curves.

The object of the present invention is to provide sets of wheels or of trucks having more than two axles intended for vehicles running on tracks or runways, and adapted to negotiate curves well, to exert laterally on the rails an evenly distributed pressure when the vehicle is subjected, in curves, to the action of the centrifugal force, and furthermore to possess the advantages inherent in the multiplication of truck axles, which advantages have been pointed out above.

The essential feature of said set of wheels lies in the fact that all its axles are connected to one another, or eventually from one group to another adjacent group through suitable connections pivoted on the axles or groups of axles about vertical axes, and at the same time, at some place, about transverse axes, in a rigid frame. In that way all the axles or several groups of axles are made movable and the effect of the shocks resulting from horizontal inequalities of the rail and of the track (such as rail joints, points, curves, etc.,) as well as of shocks resulting from unevennesses, is substantially reduced since said shocks are distributed over several wheels or axles. Furthermore, the thrust produced by the centrifugal forces when the car is turning curves is evenly distributed on the whole of the flanges of the outside wheels which diminishes the tendency to skid, and also the wear and tear of the track and of the rolling stock.

In the sets of wheels or railway tracks according to my invention, all the means employed up to this time (equalizing bars, springs, joints, etc.,) for ensuring an even distribution of the vertical load on each of the axles of a truck, are also utilized in the horizontal plane.

Furthermore, the pivoting joints that are referred to are not limited to mechanical joints; they can be made by utilizing elastic materials such as India rubber.

Preferred embodiments of my invention will be hereinafter described with reference to the accompanying drawings given by way of example, and in which:—

Fig. 1 is an elevational view of an ordinary four-wheeled railway truck shown diagrammatically, and Figs. 2 and 3 are plan views of the truck in two different positions;

Figure 4:
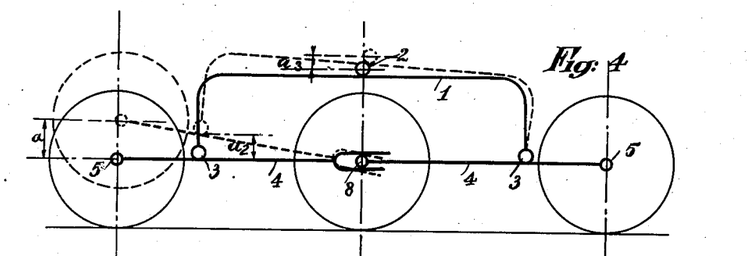
Fig. 4 is a diagrammatic elevational view of a three-axled truck according to my invention.
Figure 5:
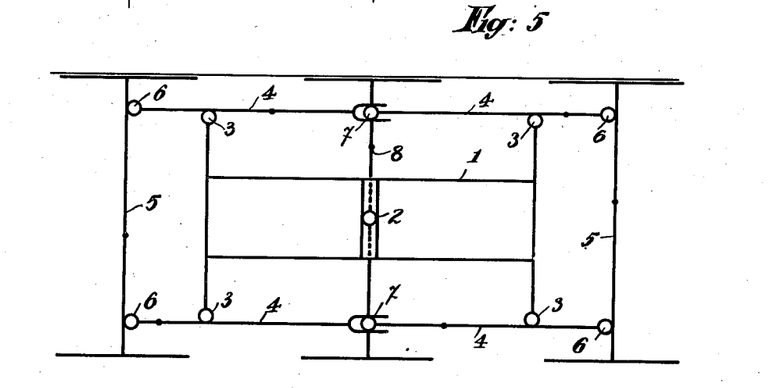
Figs. 5 and 6 are plan views corresponding to Fig. 4, and showing the truck in two different positions.
Figure 6:
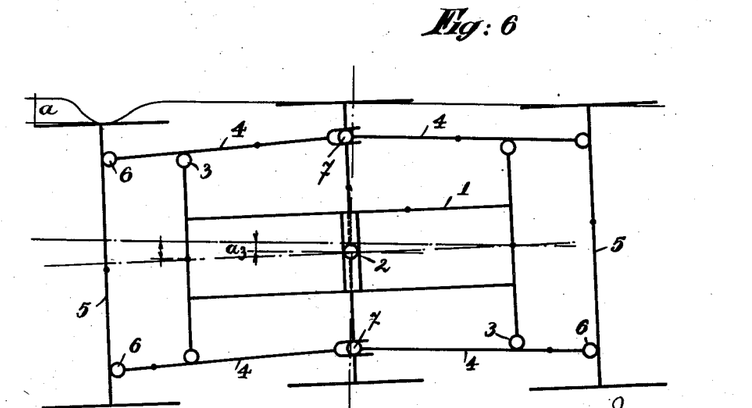

The three-axled truck of Figs. 4, 5 and 6 comprises a frame 1 adapted to pivot about kingbolt 2. Frame 1 is provided with four joints, 3 permitting the equalizing bars 4 which carry the suspension springs to pivot about a vertical axis passing through 3, and also about the horizontal axis 3—3 (Fig. 5) which is parallel to axle 5.

Oil boxes 6 of the end axles 5 and the oil boxes 7 of central axle 8 cannot move axially with respect to said axles.

Boxes 6 are mounted at the ends of equalizing bars 4, pivoted about a vertical axis passing through 6.

Boxes 7 are connected in the same way but only to the ends of a pair of equalizing bars 4, both connected to the same end axle. The fork-shaped ends of the other pair of equalizing bars rest on boxes 7 in such a manner as to load axle 8 vertically and to follow up the displacements of the said axle in the direction of its axis, while they can move with respect to boxes 7 in the direction 6—7.

Fig. 6 shows that in a truck having three axles, the transverse displacement $a$ of an end axle produces only a transverse displacement $$\frac{a}{3}$$

of the kingbolt of the truck, while the king bolt of a truck having two axles (Figs. 2 and 3) would move a distance equal to $$\frac{a}{2}.$$

Equalizing bars 4 can be replaced by the suspension springs themselves.

All the horizontal relative displacements of the axles, of the equalizing bars or the suspension springs, of the jointed side bars and of the frame of the truck above mentioned may be controlled or limited by springs or other elastic means (India rubber) or by shock absorbers, in order to obtain the desired stability.

Figure 7:
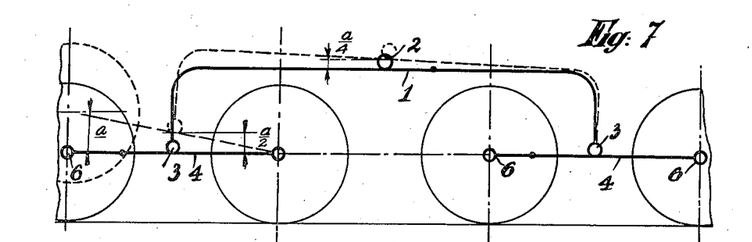
Figs. 7, 8 and 9 are diagrammatical views similar to Figs. 4, 5 and 6 respectively, and corresponding to a four-axled truck.
Figure 8:
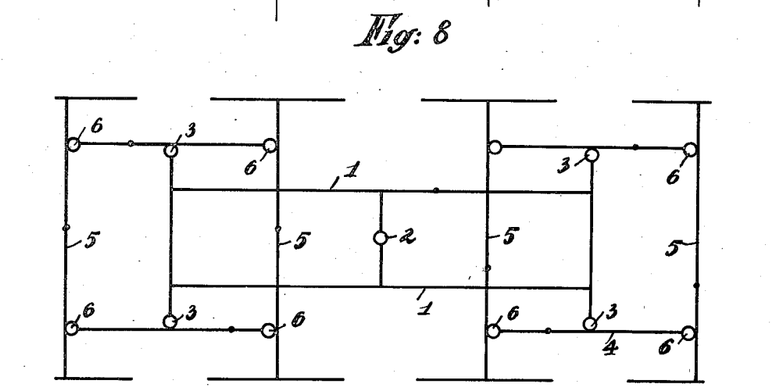
Figure 9:
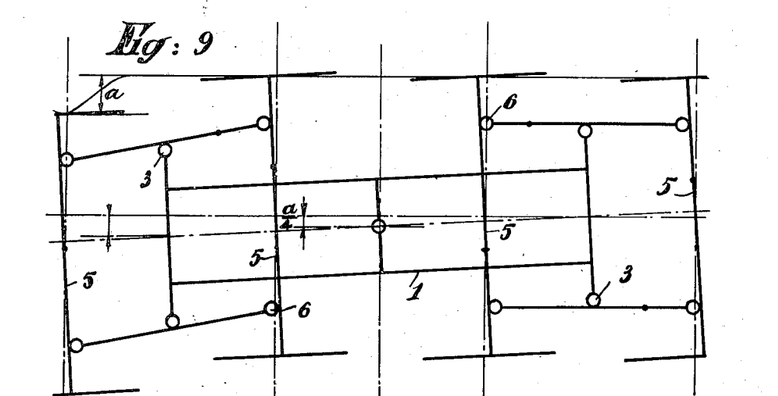

The four-axial truck of Figs. 7, 8 and 9 comprises the same elements as above described with respect to Figs. 4-6, and in particular a frame 1 pivoted about kingbolt 2. The joints 3 are identical to those of Figs. 4-6. Equalizing bars 4 that carry the suspension springs (or the suspension springs themselves) have in this case equal lever arms. The oil boxes 6 are mounted on axles 5 in such a manner that they cannot move in the direction of the axis of the axle, and are pivoted in the ends of equalizing bars 4 about a vertical axis passing through 6.

It will be seen in Fig. 9 that transverse displacement of the truck kingbolt in the case of four axles is only about one-fourth of the displacement of one of said axles when it passes over a horizontal inequality of the rail.

All the relative displacements in a horizontal plane of the various elements of said truck, may be limited or controlled by an elastic means or shock absorbers.

Figure 10:
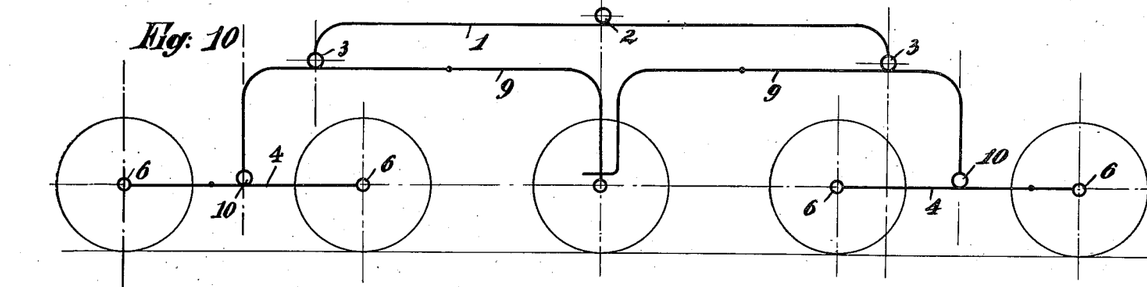
Figs. 10, 11 and 12 are diagrammatical views similar to Figs. 4, 5 and 6 respectively, and corresponding to a five-axled railway truck.
Figure 11:
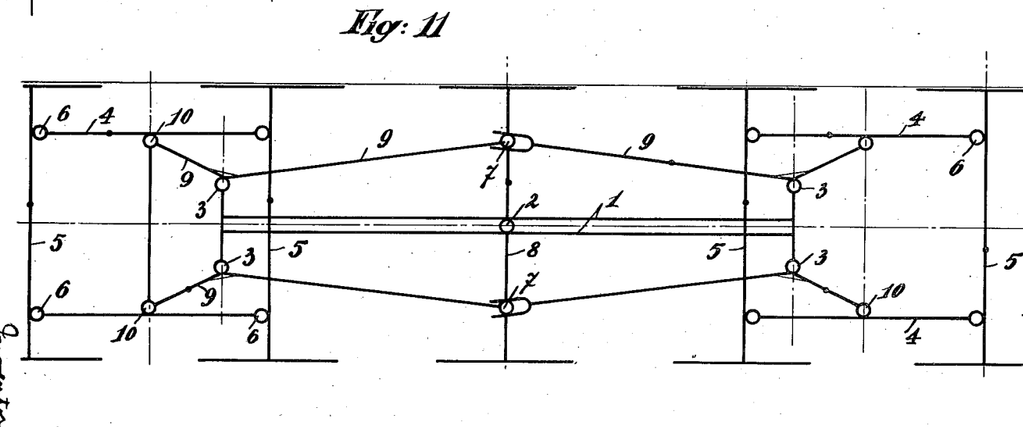
Figure 12:
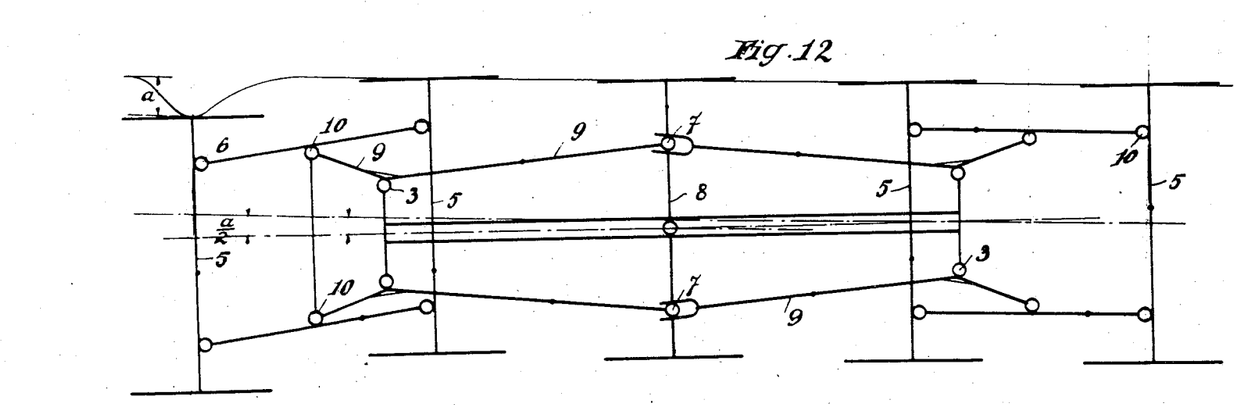

The five-axled truck of Figs. 10, 11 and 12 comprises the same elements as the trucks precedingly described, but the number of equalizing bars is increased by four. Frame 1 pivoting about kingbolt 2 supports the four joints 3. The four equalizing bars 9 are adapted to pivot about a vertical axis passing through 3 and about the horizontal axis 3—3. The ends 10 of said equalizing bars, support joints similar to joints 3, which are connected to equalizing bars or suspension springs 4. The joints and the oil boxes located at points 6 of axles 5 are identical to those of the three-axle trucks above described. The oil boxes 7 that are located on central axle 8 are connected to the ends of equalizing bars 9 as in the case of the three-axled truck above described.

If for some constructional or other reason, the three vertical axes of joints 10, 3 and 7 of equalizing bar 9 cannot be placed in the same vertical plane (Fig. 11) one of the two oil boxes 7 must be fitted on axle 8 with a certain axial play. The cross member or distance piece extending between the corresponding joints 10—10 which can be seen on the left-hand side of Fig. 11 is not absolutely necessary, but it may be used in order to make the whole more rigid, or in order to support shock absorbers, springs, stops, etc., which control or limit the displacement of the various organs.

Figure 13:
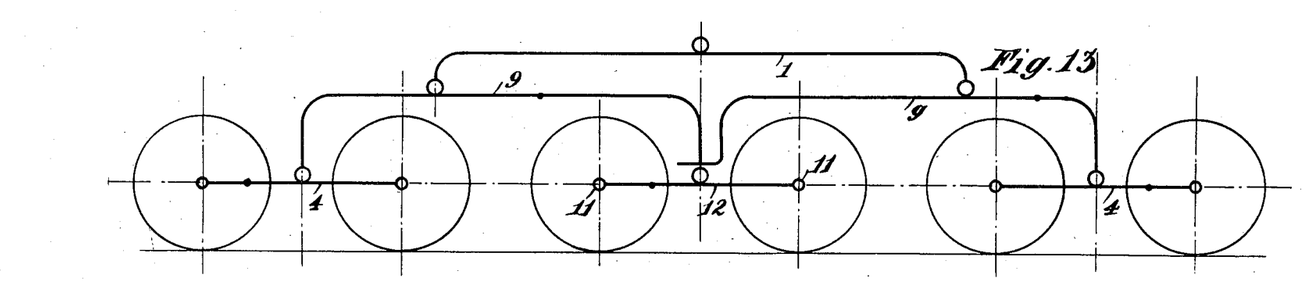
Fig. 13 is a diagrammatic elevational view of a six-axled truck according to my invention.
Figure 14:
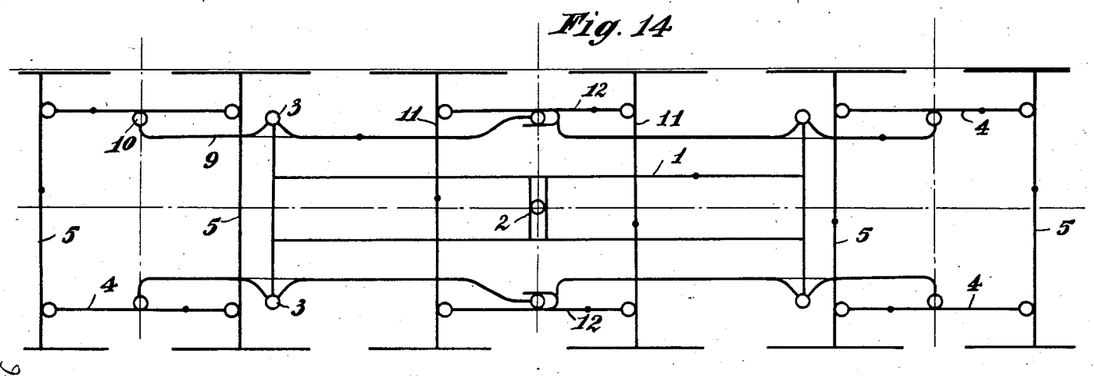
Fig. 14 is a plan view corresponding to Fig. 13.

The six-axled railway truck of Figs. 13 and 14 can be considered as a five-axled truck in which the central axle is replaced by a pair of axles 11 similar to the end bars of axles. The said axles are connected by equalizing bars 12 provided as shown in the drawings with pivoting joints.

Figure 15:
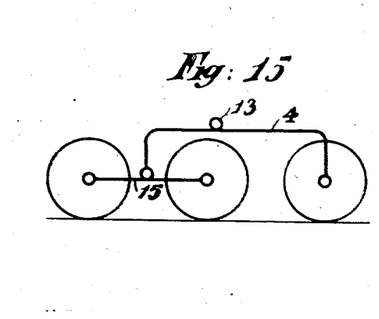
Figs. 15 and 16 are an elevational view and a plan view respectively of another type of three-axled railway truck.
Figure 16:
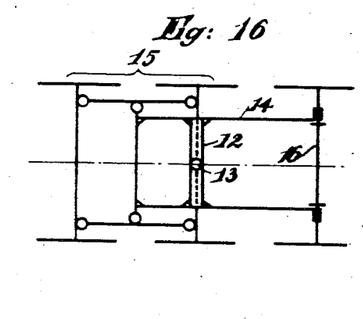

Figures 15 and 16 show another type of three-axled truck in which the cross member 12 that carries pivot 30 rests, through equalizing bar 14, on the one hand on a jointed truck 15, and on the other hand on an axle 16 along which it may slide within certain limits. Said arrangement, same as the preceding ones, may, instead of constituting a truck, that is to say, one of the small carriages supporting a railway vehicle, constitutes the set of wheels of the whole vehicle.

Figure 17:
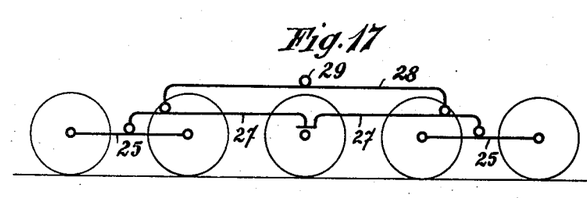
Figs. 17, 18 and 19 show in the same manner as Figs. 15 and 16 different types of five-axled trucks or sets of wheels.
Figure 18:
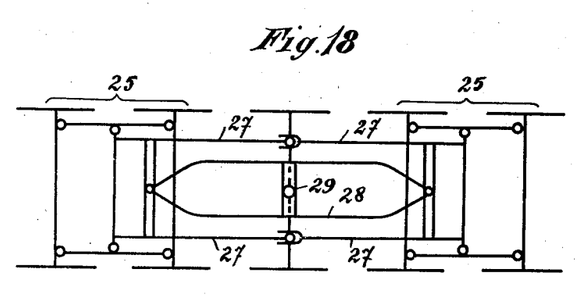

Likewise, Figs. 17 and 18 show a five-axled truck or a set of wheels consisting of two jointed trucks 25 and an intermediate axle 26 connected through equalizing bars 27 fitted with pivoted joints and sliding joints. Said equalizing bars are themselves connected together by longitudinal member 28 that carries kingbolt 29.

Figure 19:
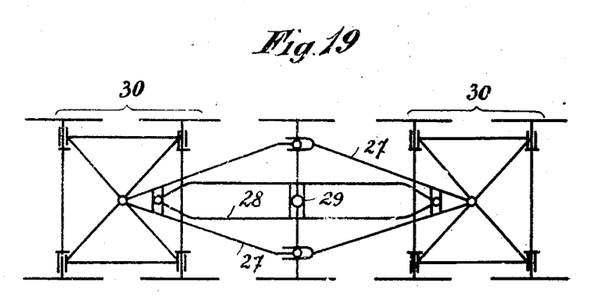

According to another embodiment of my invention, trucks 25 may be replaced by ordinary trucks 30 (Fig. 19).

Figs. 20, 21, 20a and 21a diagrammatically show a vehicle resting upon twelve axles distributed into two groups each of six axles. The six-axled truck comprises a four-axle truck 31 and a two-axle truck 32 connected together by a system of longitudinal members 33 carrying king-bolt 34. The two two-axle trucks that form the four-axle truck 31 and two-axle truck 32 are of the articulated type.

Figure 20:
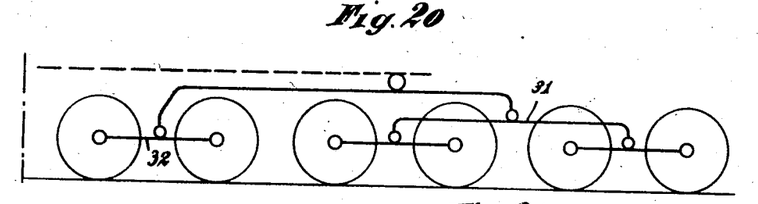
Figs. 20 and 21 show in elevational and in plan view respectively, the right-hand half of a set of wheels having twelve axles.
Figure 20A:
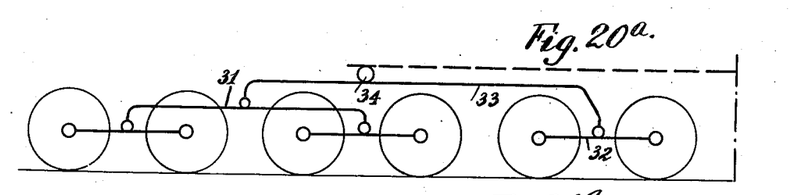
Figs. 20a and 21a are views corresponding to Figs. 20 and 21 respectively, showing the left-hand half of this set of wheels.
Figure 21:
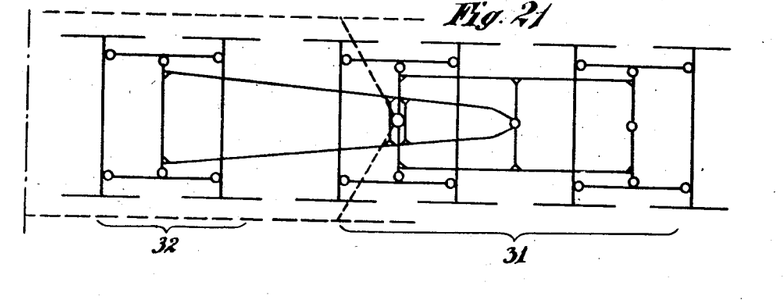
Figure 21A:
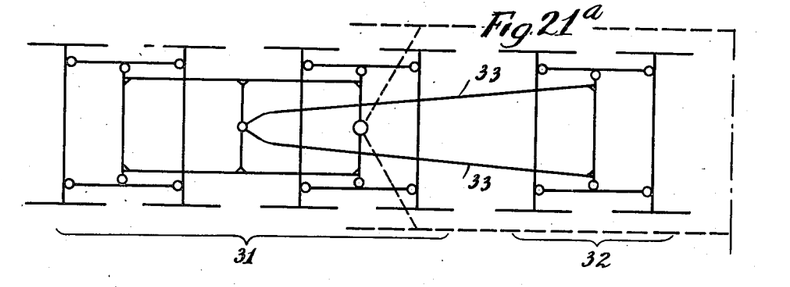
Figures 22, 23:
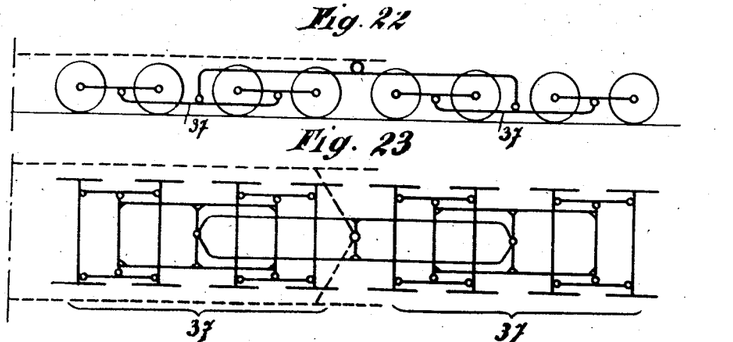
Figs. 22 and 23, 22a and 23a are views similar to Figs. 20 and 21, 20a and 21a, corresponding to sets of wheels having 16 axles.
Figure 22A:
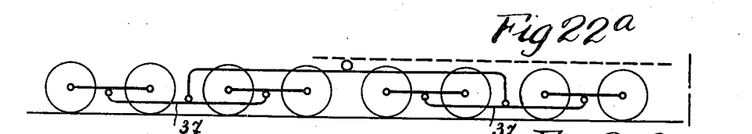
Figure 23A:
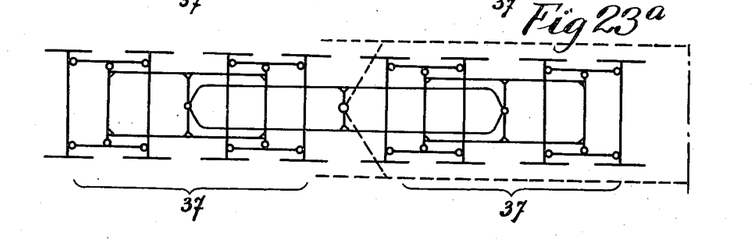

Finally Figs. 22, 23, 22a and 23a show in the same manner a vehicle having sixteen axles which are distributed into two groups in each of which I have used two four-axled trucks 37 similar to truck 31 of Figs. 20 and 21.

In the preceding figures, I have shown in dotted lines the outline of the vehicles.

It goes without saying that the embodiments above described might be modified without departing from the spirit of my invention. For instance, I might eventually make use in some cases of four-axled trucks of the usual type. The frames, equalizing bars, longitudinal members and oil boxes of the trucks above described may be disposed either on the inside or on the outside of the wheels. Of course the lateral displacements of the axles will be limited by making use of any suitable known means.

Figures 24, 25, 28:
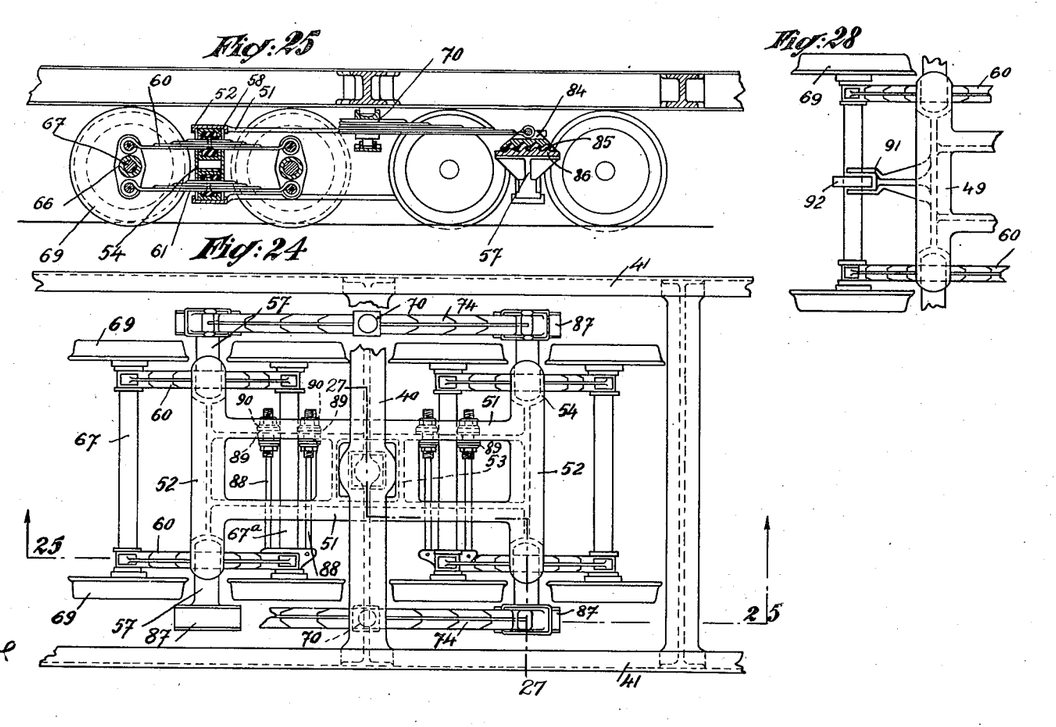
Fig. 24 is a plan view of a four-axled railway truck of the type shown in Figs. 7 to 9.
Fig. 25 is a sectional view on the line 25—25 of Fig. 24.
Figs. 28 and 29 are part plan views of a slightly modified railway truck.
Figure 27:
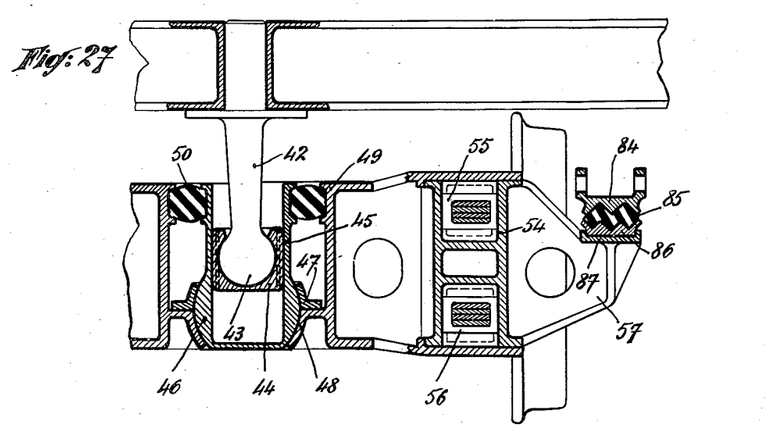
Fig. 27 is a part cross section on an enlarged scale on the line 27—27 of Fig. 24.

In the vehicle, part of which is shown in Figs. 24 and 25, the cross member 40 of the frame, the longitudinal members of which are shown at 41, carries in its central portion a kingbolt 42 (Fig. 27). Said kingbolt comprises a spherical head 43 fitted in a cavity of corresponding shape provided in a cylindrical block 44. Block 44 is slidably mounted or fitted in a sleeve 45, the lower portion of which has externally a spherical shape so as to form a ball 46. Ball 46 is adapted to move in a socket which has been shown as formed of two parts. One of said parts consists of an annular member 47 fixed to the cup-shaped member 48 that forms the other part. Cup-shaped member 48 is integral with the truck frame which is designated in the whole by reference character 49. Between the upper portion of sleeve 45 and frame 49, there is inserted an elastic fitting 50 consisting for instance of a rubber ring.

Truck frame 49 comprises in the present example, two longitudinal members 51 consisting of U-irons having a vertical web, and which, in the central portion, are connected by bars 53 that limit the housing that encloses kingbolt 42 and the organs that co-operate therewith as above described. Said members 51 carrying at the ends cross members 52 of double T shaped cross section. The frame thus constituted may either be cast in a single unit or consist of elements connected together according to known rules.

Cross members 52 clasp on either side spring holders each of which consists (Figs. 24, 26, 27) of a cage 54 having two housings 55, 56 and provided with a lateral bracket 57. In said housings 55 and 56 are disposed elastic fittings 58, 59 surrounding two longitudinal springs 60, 61 and which are either positioned in metallic cups 58a, 59a, to avoid seizing, or provided, at their lower part, with elastic packing members 58a, 59a, for instance of rubber. The ends of such springs are connected through sleeves of rubber or a similar material 62, 63 to the suspension axes 64, 65 of an axle box or shackle. Said shackle may for instance consist of a collar 66 surrounding axle 67, and of two plates (one of which is designated by reference character 68) integral with said collar and connected by pins 64, 65. Of course any other suitable type of boxes might be utilized; furthermore, the boxes might be fitted on trunnions located on the outside of wheels 69 of axle 67.

The axle boxes or shackles are preferably mounted on the axles without any lateral play.

Figure 33:
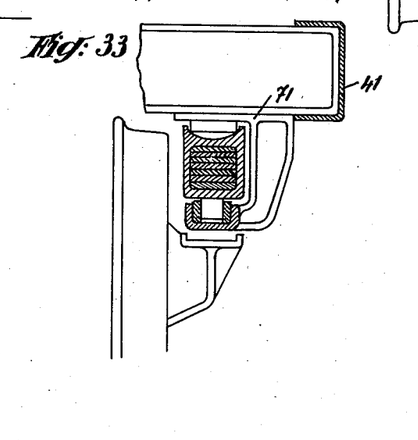
Fig. 33 is a cross section of one of the devices for connecting the longitudinal springs that distribute the load over the truck.
Figure 37:
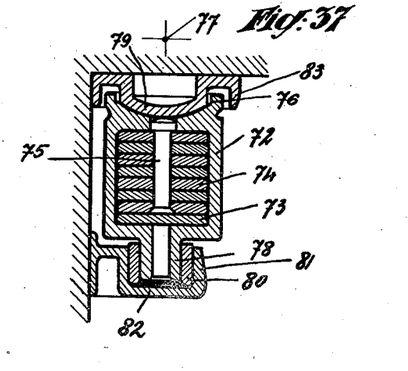
Fig. 37 is a cross section on an enlarged scale.

The load is transmitted in the following manner from the frame of the car to the frame of the truck; cross member 40 of frame 41 which carries kingbolt 42 is provided in the vicinity of its ends with supports one of which has been shown as a whole at 70, Fig. 25. Said supports may, as shown in Fig. 33, comprise a bracket or seat 71 fixed to cross member 41 in any suitable manner, for instance by means of bolts. Said bracket 71 supports a spring strap 72 (Figs. 34 and 37) in which is wedged by means of a cotter 73, a leaf spring 74 provided with a locking member 75.

Figure 34:
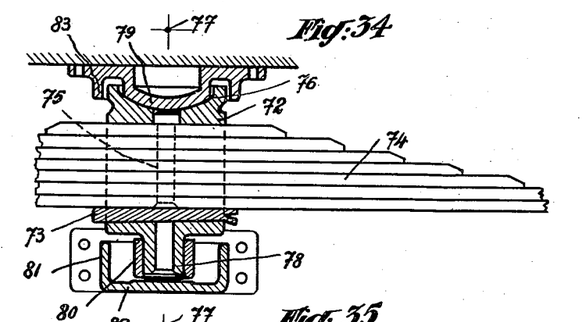
Figs. 34 and 35 are longitudinal sections of said connecting device in two different positions.

Strap 72 is provided at its upper part with a spherical cup-shaped portion 76 having its centre at 77, and at its lower part with a cylindrical trunnion 78. Cup-shaped member 76 can move on a ball-shaped part 79 within certain limits. Trunnion 78 which is surrounded by a sliding block 80 can move only in a longitudinal plane and also within certain limits, owing to the presence of a stop flange 81 in lower cup-shaped member 82 and of an annular projection 83 about ball-shaped part 79.

Figure 35:
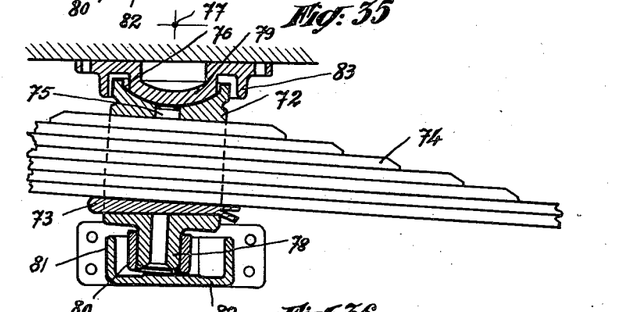
Figure 36:
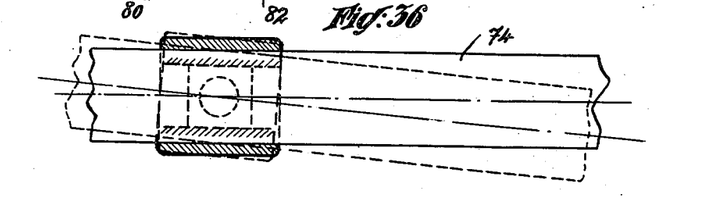
Fig. 36 is a diagrammatic plan view.

Figs. 35 and 36 clearly show the displacements that are made possible by that arrangement. The spring can turn about the axis which is normally vertical to the strap and it may also slant as shown in Fig. 12 either in one direction or the other, the axis of the strap remaining always in a vertical plane substantially parallel to the track.

The springs, such as spring 74, rest through their ends upon brackets 57 of the truck frame, preferably through the following arrangement, Fig. 25: Spring 74 is jointed (eventually with a rubber sleeve being inserted therebetween) with a shoe 84, the lower face of which is provided with transverse grooves, and which is connected through a block of elastic material 85 to shoe 86 mounted in a longitudinal slide 87. The latter is supported by bracket 57.

The lateral displacements of the axles may be limited through the following device:—The boxes of one of the two axles that are connected through springs such as 60, 61, for instance axle 67a carries one or several transverse rods 88 jointed to said boxes. Said rods are each provided with two stops disposed on either side of the web of one of the longitudinal members 51 in such a manner that the longitudinal displacement of said rods in both directions may be limited to a certain degree which corresponds to the truck negotiating a curve of the minimum radius that can be met with in actual practice. In Fig. 24, the stops each comprise an elastic pad 89 with adjusting means 90.

The device for limiting the displacement of the axles might also be made according to either of the two following embodiments of my invention:

(a) A fork 91 (Fig. 28) rigidly supported by frame 49 and the branches of which are disposed at a suitable distance from each other cooperates with a collar 92 keyed on the axle or integral therewith. Of course any equivalent disposition might be utilized.

Figure 29:
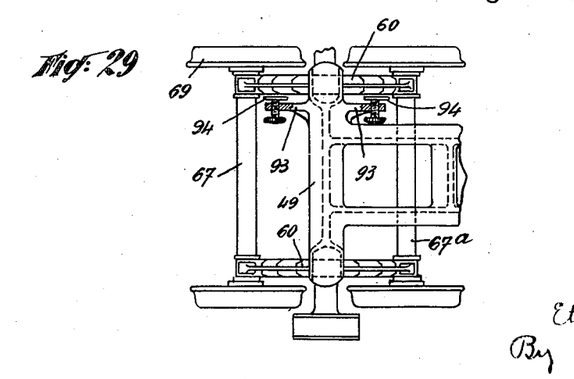

(b) Arms 93 (Fig. 29) integral with frame 49 or fixed thereto and provided with pads 94 adjustably mounted thereon limit the displacements of the axle by means of said pads.

All these arrangements, or mechanically equivalent arrangements might of course be combined on the same railway truck.

Figure 26:
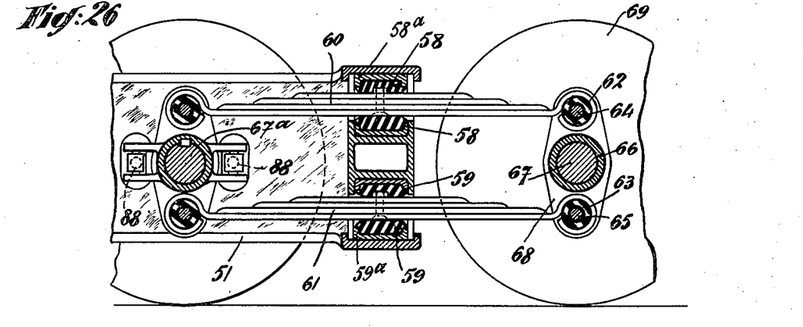
Fig. 26 is a part sectional view on an enlarged scale similar to Fig. 25.
Figure 30:
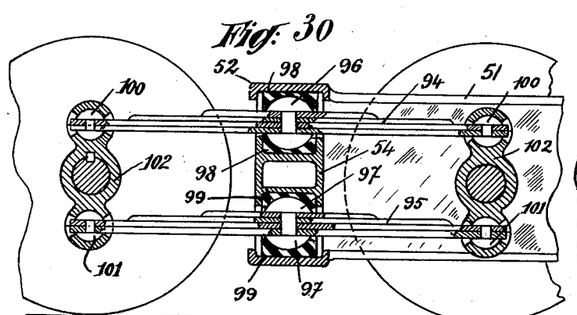
Figs. 30 and 31 are sectional views similar to Figs. 26 and 27 respectively, corresponding to another type of railway truck.
Figure 31:
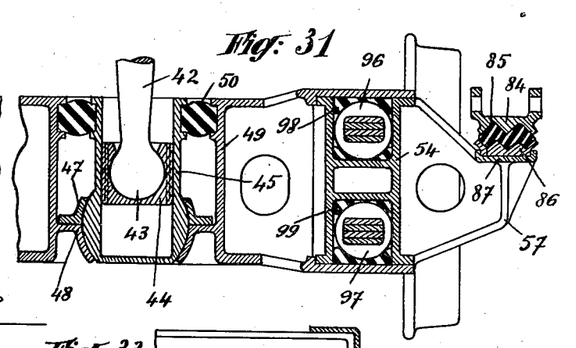
Figure 32:
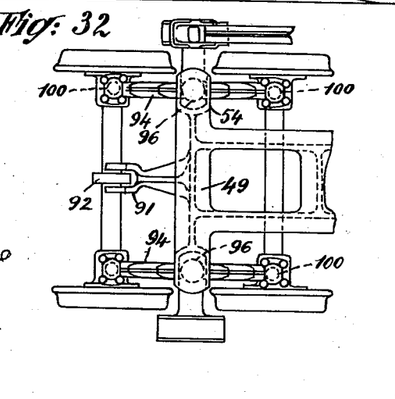
Fig. 32 is a plan view similar to Fig. 28 of said modified truck.

In Figs. 30 to 32, I have shown a slightly different embodiment of the railway truck according to my invention. Springs 94, 95, which correspond to springs 60, 61 of Fig. 26, are each provided with a special strap with two ball and socket joints. Straps 96 and 97 of said springs are inserted in cup-shaped members 98, 99 either metallic or elastic, themselves inserted in corresponding housings provided in cage 54. The ends of the springs are mounted in the same manner, owing to ball and socket joints 100, 101 provided in box 102.

It will readily be understood that some, or all, of the axles of the truck might be driving axles. Furthermore, instead of having the loads uniformly distributed over the different axles, said loads might be so devised that some axles are more strongly loaded than the others. Said distribution of the loads, instead of being insured through springs, might be provided for by means of equalizing bars, or again by means of a composite system of springs and equalizing bars, said springs and equalizing bars being optionally disposed in a longitudinal direction instead of in a transverse direction. The springs, can be, in case of need, completed by safety connecting rods. Finally, it should be well understood that the details and the arrangements that have just been described may be fully applied to railway trucks possessing a different number of axles, their application resulting directly from the principles that have just been mentioned.

In a general manner, while I have described what I deem to be practical and efficient embodiments of my invention it should be well understood that I do not wish to be limited thereto as there might be changes made in the arrangement, disposition and form of the parts without departing from the principle of my invention as comprehended within the scope of the appended claims.

What I claim is:

1. In a vehicle a truck of the type described which comprises in combination, a pair of axles, a pair of wheels for each axle, two transversely rigid connecting members for said pair of axles, each pivoted at either end, about vertical and transverse axes, to the axles of said pair respectively, at least another axle, a pair of wheels for the last mentioned axle, at least one transversely rigid element movably connected with the last mentioned axle and pivotally jointed to each of said connecting members about vertical and horizontal axes, and means for connecting said element with said vehicle.

2. In a vehicle, a truck of the type described which comprises in combination, two pairs of axles, a pair of wheels for each axle, two transversely rigid connecting members for each pair of axles, each pivoted at either end, about vertical axes, to the axles of said pair respectively, a rigid frame pivotally jointed to each of said four connecting members respectively about vertical axes, and means for connecting said rigid frame to said vehicle.

3. In a vehicle, a truck of the type described which comprises in combination, two pairs of axles, a pair of wheels for each axle, two transversely rigid connecting members for each pair of axles, each pivoted at either end, about vertical and horizontal axes, to the axles of said pair respectively, a rigid frame pivotally jointed to each of said four connecting members respectively about vertical and horizontal axes, and means for connecting said rigid frame to said vehicle.

4. In a railway vehicle, a truck of the type described which comprises in combination, a pair of axles, a pair of wheels for each axle, two springs for said pair of axles extending in the longitudinal direction of said vehicle, a shackle mounted without transverse play on each of the axles of said pair respectively, universal joints for connecting the ends of said springs to said shackles, at least another axle, a pair of wheels for the last mentioned axle, a frame movably connected with the last mentioned axle, means for movably connecting said springs to said frame, adapted to permit relative pivotal movement between said springs and said frame about a vertical axis, and means for connecting said frame to said vehicle.

5. A device according to claim 4 in which the means for movably connecting said springs to said frame consists of elastic fittings secured to said frame and tightly holding said springs respectively.

6. A device according to claim 4, in which the means for movably connecting said springs to said frame include spherical bearings on said springs, and means on said frame adapted to cooperate with said bearings.

7. A device according to claim 4, further comprising means for limiting the displacements of the first mentioned axles in the direction of their axes.

8. A device according to claim 4 further comprising a rigid frame for the vehicle, and longitudinal springs interposed between the last mentioned frame and points of the first mentioned frame that are remote from the centre thereof.

9. A device according to claim 4, further comprising a rigid frame for the vehicle, and longitudinal springs placed on the outside of the wheels interposed between the last mentioned frame and points of the first mentioned frame that are remote from the centre thereof.

10. A device according to claim 4, further comprising a rigid frame for the vehicle, elastic shoes carried by the first mentioned frame at points thereof remote from its center, and longitudinal springs interposed between the frame of the vehicle and said elastic shoes.

11. A device according to claim 4, further comprising a rigid frame for the vehicle, longitudinal springs interposed between the last mentioned frame and the frame of the truck, a strap having spherical bearings surrounding each of said springs, and spherical surfaces on the frame of the vehicle adapted to coact with said spherical bearings.

12. In a vehicle, a truck of the type described, which comprises in combination, a pair of axles, a pair of wheels for said axles respectively, two transversely rigid connecting members for said pair of axles each pivoted at either end about vertical and transverse axes to said axles respectively, at least one other axle, a pair of wheels for the last mentioned axle, at least one transversely rigid longitudinal element movably connected with the last mentioned axle and pivotally jointed to each of said connecting members about vertical and horizontal axes, means for connecting said longitudinal element with said vehicle, and means for limiting the displacements of said axles with respect to said element in the direction of said axles.

13. In a vehicle, a truck of the type described which comprises in combination, two pairs of axles, a pair of wheels for each axle, two connecting members for each pair of axles, each pivoted at either end about vertical axes to the axles of said pair respectively, a rigid frame pivotally jointed to each of said four connecting members respectively about vertical axes, a kingbolt for connecting said rigid frame to said vehicle, and means for limiting the displacements of said axles with respect to said frame in the direction of said axles.

14. In a vehicle, a truck of the type described, which comprises in combination, two pairs of axles, a pair of wheels for each of said axles, two connecting members for each pair of axles, each pivoted at either end about vertical and horizontal axes to the axles of said pair respectively, a rigid frame pivotally jointed to each of said connecting members respectively about vertical and horizontal axes, a kingbolt for connecting said rigid frame to said vehicle, and means for limiting the displacements of said axles with respect to said frame in the direction of said axles.

15. In a vehicle, a truck of the type described which comprises in combination, a pair of axles, a pair of wheels for each axle, two connecting members for said pair of axles each pivoted at either end about vertical axes to said axles respectively, at least one other axle, a pair of wheels for the last mentioned axle, at least one longitudinal element movably connected with the last mentioned axle and pivotally connected to each of said connecting members about vertical axes, means for connecting said longitudinal element with said vehicle, a vertical part carried by said element, at least one arm mounted in an axially immovable position on one of the first mentioned axles, at least one rod pivoted to said arm and extending parallelly to the last mentioned axle, and stops carried by said rod and extending on either side of said vertical part adapted to cooperate with said part for limiting the displacements of the corresponding axles with respect to said longitudinal element in a direction parallel to said axles.

16. In a vehicle, a truck of the type described which comprises in combination, a pair of axles, a pair of wheels for each axle, two connecting members for said pair of axles each pivoted at either end about vertical axes to said axles respectively, at least one other axle, a pair of wheels for the last mentioned axle, at least one movable element extending in a longitudinal direction of the vehicle, movably connected with the last mentioned axle and pivotally connected to each of said connecting members about vertical axes, means for connecting said longitudinal element with said vehicle, a stop carried by one of the axles of said pair and a fork carried by said longitudinal element surrounding said stop so as to cooperate therewith for limiting the displacements of the axles of said pair with respect to said longitudinal element in a transverse direction.

17. In a vehicle, a truck of the type described, which comprises in combination, a pair of axles, a pair of wheels for each axle, two connecting members for said pair of axles each pivoted at either end about vertical axes to said axles respectively, at least one other axle, a pair of wheels for the last mentioned axle, at least one movable element extending in a longitudinal direction of the vehicle, movably connected to the last mentioned axle and pivotally connected to each of said connecting members about vertical axes, means for connecting said longitudinal element with said vehicle, an arm carried by said longitudinal element and a stop adjustably carried by said arm adapted to cooperate with one of said connecting members for limiting the displacements of the axles of said pair with respect to said longitudinal element in a transverse direction.

18. A truck according to claim 13 in which the means for limiting the displacements of the axles with respect to the frame comprise, for each pair of axles, a vertical part carried by said frame, at least one arm mounted in an axially immovable position on one of the axles of said pair, at least one rod pivoted to said arm and extending parallelly to the last mentioned axle, and stops carried by said rod and extending on either side of said vertical part.

19. A truck according to claim 13 in which the means for limiting the displacements of the axles with respect to the frame comprise, for each pair of axles, a stop carried by one of the axles of said pair and a fork carried by said frame and surrounding said stop so as to cooperate therewith.

20. A truck according to claim 13 in which the means for limiting the displacements of the axles with respect to the frame comprise, for each pair of axles, an arm carried by said frame, and a stop adjustably carried by said arm adapted to cooperate with one of said connecting members.

21. In a vehicle, a truck of the type described which comprises, in combination, a pair of axles; a pair of wheels for each axle; two transversely rigid suspension springs of the leaf type for said axles, each pivoted at either end about vertical axes to the axles of said pair respectively; at least another axle; a pair of wheels for the last mentioned axle; at least one transversely rigid element movably connected with the last mentioned axle and pivotally jointed to each of the said suspension springs about vertical axes; and means for connecting said element with said vehicle.

22. In a vehicle, a truck of the type described, which comprises, in combination, a pair of axles, a pair of wheels for each axle, two parallel leaf springs for said pair of axles extending in the longitudinal direction of said vehicle, means for connecting the ends of said springs to said two axles respectively arranged to permit pivotal displacements of said springs with respect to said axles about both a vertical and a horizontal axis, at least another axle, a pair of wheels for the last mentioned axle, a frame movably connected with the last mentioned axle, means for movably connecting said frame with said springs, and means for connecting said frame with said vehicle.

23. In a vehicle, a truck of the type described, which comprises, in combination, two pairs of axles, a pair of wheels for each of said axles, two parallel leaf springs for each pair of axles extending in the longitudinal direction of said vehicle, means for connecting the ends of each of said springs to the two axles of the corresponding pair respectively arranged to permit pivotal displacements of said springs with respect to said axles about both a vertical and a transverse horizontal axis, a rigid frame, means for pivotally connecting said frame to said springs arranged to permit pivotal displacements of said frame with respect to each of said springs about both a vertical and a transverse horizontal axis, and a kingbolt for connecting said rigid frame with said vehicle.

24. In a vehicle, a truck of the type described, which comprises, in combination, two pairs of axles, a pair of wheels for each of said axles, two parallel leaf springs for each pair of axles extending in the longitudinal direction of said vehicle, a shackle mounted without transverse play on each end of each of said axles, a rubber sleeve interposed between each end of each of said springs and the corresponding shackle, whereby said springs can pivot with respect to said axles about both a vertical and a transverse horizontal axis, a rigid frame, rubber blocks connecting said springs with said frame, whereby each of said springs can pivot with respect to said frame about both a vertical and a transverse horizontal axis, and a kingbolt for connecting said rigid frame with said vehicle.

25. In a vehicle, a truck of the type described, which comprises, in combination, two pairs of axles, a pair of wheels for each of said axles, two parallel leaf springs for each pair of axles extending in the longitudinal direction of said vehicle, means for connecting the ends of each of said springs to the two axles of the corresponding pair respectively, arranged to permit pivotal displacements of said springs with respect to said axles about both a vertical and a transverse horizontal axis, a rigid frame, means for pivotally connecting said frame to said springs, arranged to permit pivotal displacements of said springs with respect to said frame about both a vertical and a transverse horizontal axis, a kingbolt for movably connecting said rigid frame with said vehicle, and means for limiting the transverse displacements of said axles with respect to said frame.

26. In a vehicle, a truck of the type described, which comprises, in combination, two pairs of axles, a pair of wheels for each of said axles, two parallel leaf springs for each pair of axles extending in the longitudinal direction of said vehicle, a shackle mounted without transversal play on each end of each of said axles, a rubber sleeve interposed between each end of each of said springs and the corresponding shackle, whereby said springs can pivot with respect to said axles about both a vertical and a transverse horizontal axis, a rigid frame, rubber blocks connecting said springs with said frame, whereby each of said springs can pivot with respect to said frame about both a vertical and a transverse horizontal axis, a kingbolt for movably connecting said rigid frame with said vehicle, and means for limiting the transverse displacements of said axles with respect to said frame.

27. A flexible truck for railway vehicles, which comprises, in combination, a frame, at least three wheel-carrying axles adapted to support said frame and transversely movable with respect thereto, means for keeping said axles in substantially parallel relation with one another irrespective of their transverse displacements, and adjustable means for limiting the transverse displacements of said axles with respect to said frame.

28. A railway vehicle truck which comprises, in combination, a frame, a pair of wheel carrying axles, vertically yielding suspension units having pivotal connection about vertical axes with said axles, adapted to keep them in substantially parallel relation with one another, at least one other axle, means for transmitting the load of said frame to said axles, said means including means adapted to permit relative pivotal movement about a vertical axis for connecting said suspension units with said frame at points intermediate the axles of said pair of axles.

29. In a vehicle truck having at least three wheel carrying axles, the combination of an articulated structure for connecting said axles together so as to permit relative transverse displacements thereof with respect to one another, whereby the centers of the axles may be located along a curved line, said structure including means for keeping said axles in substantially parallel relation with one another irrespective of their transverse displacements, with additional means located in close proximity to said axles, adapted solely for preventing the curvature of said line from exceeding a predetermined amount.

30. In a vehicle having a truck with two pairs of wheel carrying axles, a load equalizing system for carrying said vehicle on said truck which comprises, in combination, a frame for said truck, a plurality of equalizing members between said vehicle and said frame, a plurality of vertically resilient equalizing members disposed between said frame and one pair of axles, and a plurality of equalizing members disposed between said frame and the other pair of axles, the vertically resilient equalizing members being adapted to pivot about substantially vertical axes with respect to said frame.

31. In a vehicle including a body portion and a truck having four wheel carrying axles, the combination of a frame for said truck, front and rear supports on either side of said frame located at a distance from each other, in the transverse direction, at least equal to the track gauge, longitudinal suspension units, disposed between said body portion and said frame, extending from the front supports to the rear supports, attached at a point intermediate their length to said body portion, adapted to rest upon said supports, and longitudinally resilient members operatively interposed between said longitudinal units and said supports.

32. In a vehicle truck having a frame and at least three wheel carrying axles for supporting said frame, the combination of a pair of wheel carrying axles, vertically flexible leaf springs arranged longitudinally between the axles of said pair and transversely spaced apart from each other, universal joints for connecting both ends of each of said springs to the axles of said pair, respectively, thus forming a deformable parallelogram, universal joints for connecting said springs to said frame at points intermediate between the axles of said pair, and means for limiting the deformations of said parallellogram in the transverse direction.

33. A four axle car truck which comprises a longitudinal rigid frame; a front articulated parallelogram having its longitudinally extending sides pivoted on said frame about vertical axes, the transversely extending sides of the parallelogram being two of the four axles of said truck; a rear articulated parallelogram having its longitudinally extending sides pivoted on said frame about vertical axes, the transversely extending sides of said rear parallelogram being the two other axles of said truck; and means associated with each parallelogram, for positively limiting the displacements of one of the sides of said parallelogram with respect to said rigid frame.

34. In a vehicle having a truck with two pairs of wheel carrying axles transversely disposed with respect to said truck, a load equalizing system for carrying said vehicle on said truck which comprises, in combination, a rigid frame for said truck, a plurality of vertically resilient, transversely rigid and longitudinally extending equalizing members between said vehicle and said frame, a plurality of vertically resilient, transversely rigid and longitudinally extending equalizing members disposed between said frame and one pair of axles, a plurality of vertically resilient, transversely rigid and longitudinally extending equalizing members disposed between said frame and the other pair of axles, the equalizing members disposed between the frame and the axles being adapted to pivot about substantially vertical axes with respect to said frame.

ETTORE BUGATTI.